United States Patent
Kim (10) Patent No.: US 6,275,215 B1
(45) Date of Patent: Aug. 14, 2001

(54) MOUSE HAVING BUTTONS WHICH CAN BE OPERATED BOTH VERTICALLY AND HORIZONTALLY

(75) Inventor: Jin-Hyung Kim, Seoul (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/134,910

(22) Filed: Aug. 17, 1998

(30) Foreign Application Priority Data

Aug. 16, 1997 (KR) .................................................. 97-22268

(51) Int. Cl.[7] ...................................................... G09G 5/08
(52) U.S. Cl. .............................................................. 345/163
(58) Field of Search ..................................... 345/163, 156, 345/157, 158, 164, 166; D14/114, 402–410; 361/683

(56) References Cited

U.S. PATENT DOCUMENTS

| 5,063,289 | 11/1991 | Jasinski et al. | 250/221 |
| 5,268,674 | 12/1993 | Howard et al. | 345/163 |
| 5,555,894 | 9/1996 | Doyama et al. | 600/595 |
| 5,576,733 | 11/1996 | Lo | 345/163 |
| 5,646,821 | 7/1997 | Sun | 361/683 |
| 5,657,051 | 8/1997 | Liao | 345/163 |
| 5,870,081 | * 2/1999 | Wu | 345/163 |
| 5,880,715 | * 3/1999 | Garrett | 345/163 |
| 6,022,471 | * 6/2000 | Lo | 345/163 |
| 6,069,614 | * 5/2000 | Singhai | 345/158 |
| 6,097,371 | * 8/2000 | Siddiqui et al. | 345/164 |

* cited by examiner

Primary Examiner—Richard Hjerpe
Assistant Examiner—Francis Nguyen
(74) Attorney, Agent, or Firm—Robert E. Bushnell, Esq.

(57) ABSTRACT

A mouse includes: an upper case, a lower case, and a rotary member housed in the lower case. Operating levers are provided at a side portion of the upper case and each has a push member integrally formed at lower surface the operating lever such that at the bottom side thereof a first contact portion and a second contact portion are formed laterally to have a stepwise shape and movable in the vertical and horizontal directions. The lower case has an aperture formed in a central portion thereof and a circumference wall in which an elongated guide hole is formed. The rotary member has a ring shape plate rotatably supported around the aperture of the lower case and provided with a mouse movement detector. A pushbutton switch is mounted in a bottom portion of the lower case. The operating portion of the pushbutton switch is operated by the first and second contact portions of the push member. Also, a lever is provided extending from periphery of the rotary member and having at one end thereof an operating knob being inserted in the guide hole of the circumferential wall to rotate the rotary member along the guide hole. Further, a rotary member positioning element prevents rotation of the rotary member within the rotating range in the assembled state. This invention permits any user to readily change the mouse button compressing fingers from the index finger to the thumb or from the middle finger to the ring or little finger.

13 Claims, 7 Drawing Sheets

Fig. 1

*(Related Art)*

Fig. 2

*(Related Art)*

MOUSE HAVING BUTTONS WHICH CAN BE OPERATED BOTH VERTICALLY AND HORIZONTALLY

CLAIM OF PRIORITY

This application makes reference to, incorporates the same herein, and claims all benefits accruing under 35 U.S.C. §119 from an application for A MOUSE DEVICE earlier filed in the Korean Industrial Property Office on the 16$^{th}$ of Aug. 1997 and there duly assigned Ser. No. 22268/1997.

BACKGROUND OF THE INVENTION

1. Field of the Invention

The present invention relates to a mouse, and more particularly to a mouse having a structure for enabling the switch operating levers or buttons thereof to be operated in both vertical and horizontal directions.

2. Description of the Related Art

Generally, mice have been used as spatial information input devices for personal computers. The movement of the mouse determines the position of a cursor on screen of a display connected to its computer host. Further, one or more buttons of the mouse enables the user to indicate what he wants to do. With the use of the mouse, the personal computer became more accessible.

An earlier mouse included upper and lower cases of a plastic material which were united together by screws. Formed in the upper case were two mouse buttons or operating levers. A cord connected the mouse to a computer.

Normally, the mouse had pushbutton switches located insider the casing to effect various control operations when activated. The pushbutton switches were disposed on a circuit board with their operating portions facing upward. The operating levers had push pins each extending vertically from a center portion of the lower surface thereof to compress the operating portions of the pushbutton switches.

Such a mouse was usually designed for users to operate the operating levers with the index and middle fingers so that the levers were moved in the downward direction. As personal computers moved into the graphic user interface environment, the user of the mouse had increased and thus the frequent compressing of the operating levers had occurred.

The following patents each discloses features in common with the present invention: U.S. Pat. No. 5,646,821 to Sun, entitled *Portable Computer With Trackball Keys Mounted On An Edge Of A Computer Housing*, U.S. Pat. No. 5,063,289 to Jasinski et al, entitled *Combined Mouse And Trackball*, U.S. Pat. No. 5,657,051 to Liao, entitled *Multi-dimensional Mouse For Use With Computers*, U.S. Pat. No. 5,576,733 to Lo, entitled *Ergonomic Computer Mouse*, U.S. Pat. No. 5,268,674 to Howard et al., entitled *Mechanically Latching Mouser Button*, and U.S. Pat. No. 5,555,894 to Doyama et al, entitled *Force Sensation Exhibiting Device, Data Input Device And Data Input Equipment*.

A difference between the present invention and the Sun '821 patent lies in the fact that the formation of the ribs (33, 34, and 35) of the Sun '821 and the push member 36 of the present invention are different. The push member of the present invention has at its bottom portion a first contact portion and a second contact portion formed laterally adjacent the switch. This enables the mouse button itself to actuate the switch in both vertical and horizontal directions. On the other hand, the rib of the Sun '821 patent has a cam follower face to be operated with a cam face formed on an end of the edge of another structure. Thus, the button structure of the present invention is simpler and suitable for use with ordinary mice.

Furthermore, the structure of the separately movable part between the two cases, such as the rotary member 50 of the present invention, is not taught nor suggested by the Jasinski '289 patent, for example. Note that the rotary member is essential to returning the coordinate of the ball rotation detector to its original position when the gripping angle is changed to press the left mouse button with the thumb. The structure of button and rotary member of the present invention permits any user to readily change the button compressing fingers, and thereby allowing the continual use of the mouse.

SUMMARY OF THE INVENTION

The present invention is intended to solve the prior art problems, and it is therefore an object of the invention to provide a mouse which facilitates any user to readily compress the mouse buttons by using any of his fingers.

In accordance with the invention, there is provided a mouse which comprises: an upper case; an operating lever provided at a side portion of the upper case and having a push member integrally formed at lower surface of the operating lever such that at the bottom side thereof a first contact portion and a second contact portion are formed laterally to have a stepwise shape and movable in the vertical and horizontal directions; a lower case having an aperture formed in a central portion thereof and a wall extending from the circumference of the bottom portion thereof, in which an elongated guide hole is formed in a side portion of the circumferential wall; a rotary member having a ring shape plate being rotatably supported around the aperture of the lower case and provided with a mouse movement detector; a pushbutton switch mounted in a bottom portion of the lower case having an operating portion thereof being operated by the first and second contact portions of the push member; a lever extending from a periphery of the rotary member and having at one end thereof an operating knob being inserted in the guide hole of the circumferential wall of the lower case to rotate the rotary member along the guide hole; a means for positioning the rotary member within the rotating range set by the guide hole.

In the preferred form of the present invention, the first contact portion is in contact with the operating portion of the pushbutton switch, in the assembled state, and the second contact portion include a slanted portion extending downwardly from the first contact portion.

Further, the rotary member support means includes a pair of hook pieces formed integrally in the periphery of the ring plate in opposite directions and a pair of support members extending along the periphery of the aperture of the lower case and having an elongated hole being fitted by the hook pieces.

Preferably, the extension lever is located at a position perpendicular to a line crossing a pair of hook pieces. Also, the extension lever has at an end portion thereof a resilient L-shaped leg member in which the operating knob is formed.

Advantageously, the rotary member positioning means includes a projection formed adjacent the operating knob in the leg member and a toothed portion formed in a portion of the inner surface of the circumferential wall corresponding to the length of the guide hole, thereby engaging the projection of the leg member with the toothed portion of the circumferential wall in the assembled state.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
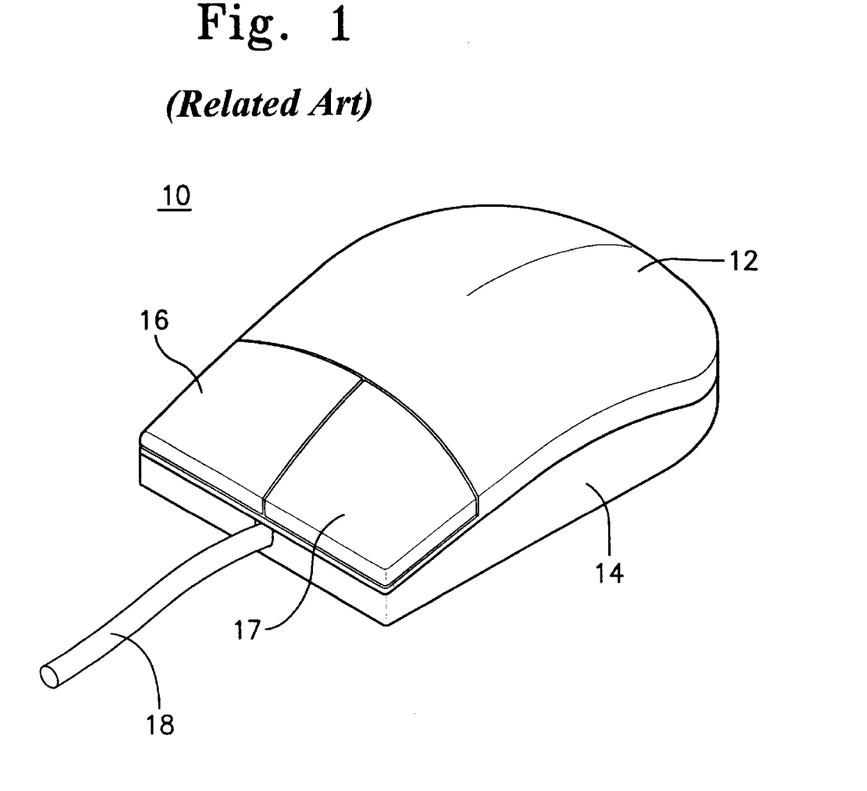
FIG. 1 is a perspective of an earlier mouse of a type having two mouse buttons.

An earlier mouse can be exemplified by FIG. 1, in which the mouse 10 includes upper and lower cases 12 and 14 both made from plastic materials and united together by screws (not illustrated). Formed in the upper case 12 of its left portion are two mouse buttons or operating levers 16 and 17. Reference number 18 denotes a cord which connects the mouse 10 with the computer.

Figure 2:
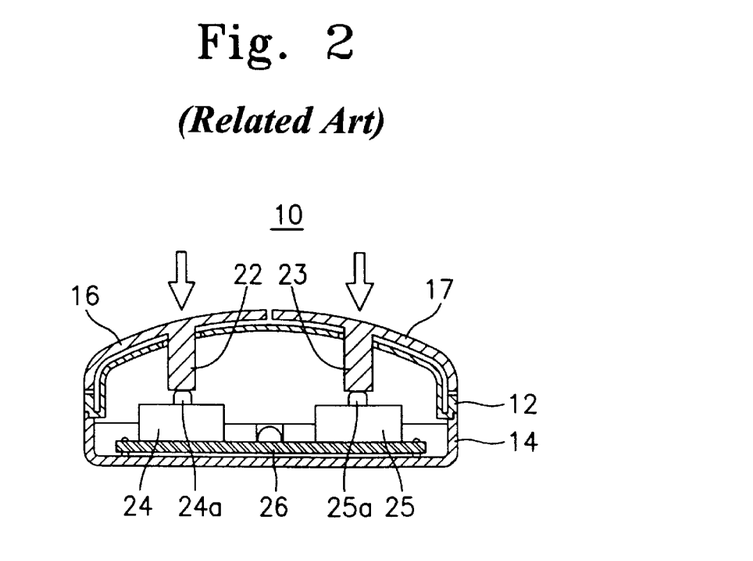
FIG. 2 is a sectional view of FIG. 1, for showing push-button switches located inside the casing and push pins provided below the mouse buttons.

Normally, as shown in FIG. 2, the mouse 10 has push-button switches 24 and 25 located inside the casing to effect various control operations when activated. The pushbutton switches 24 and 25 are disposed on a circuit board 26 with their operating portions 24a and 25a facing upward. Also, the operating levers 16 and 17 have push pins 22 and 23 each extending vertically from a center portion of the lower surface thereof to compress the operating portions 24a and 25a of the pushbutton switches.

Such a mouse is usually designed for users to operate the operating levers 16 and 17 with the index and middle fingers so that the levers 16 and 17 are moved in the downward direction. As personal computers moved into the graphic user interface environment, the use of the mouse is increasing and thus the frequent compressing of the operating levers is occurring.

However, when the mouse is used for a long time, it causes pain to the index and middle fingers and it is reported that the long-term use of the mouse may affect muscular nervous tissue of the hands as found in the use of the computer keyboard.

Further, as for the disabled lacking the index and middle fingers, the use of the mouse of the above type is very inconvenient or almost impossible.

Figure 3:
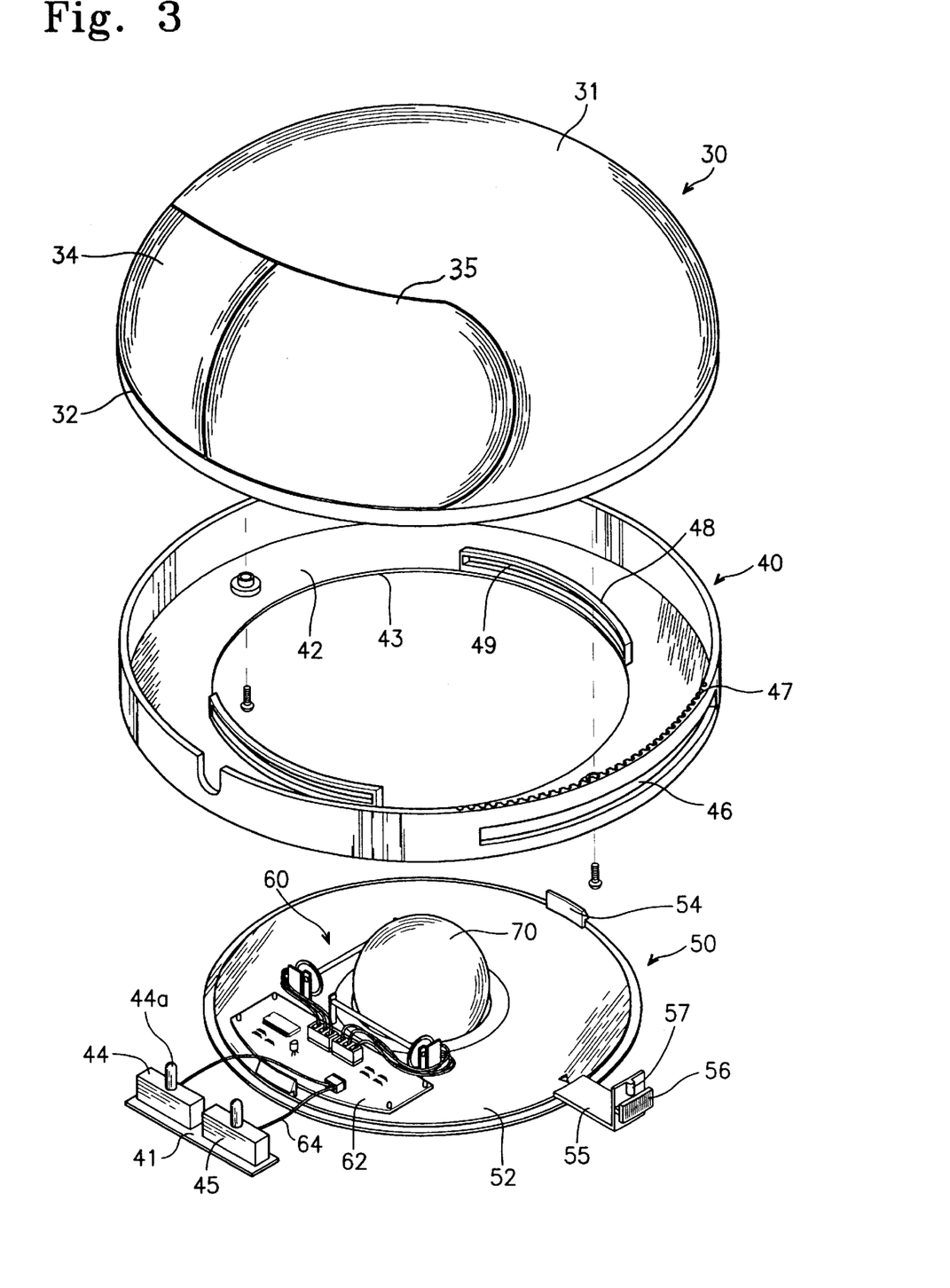
FIG. 3 is an exploded perspective view of a mouse embodying the present invention.

Referring to FIG. 3, there is shown a mouse in accordance with the present invention. The mouse generally comprises an upper case 30, a lower case 40, and a rotary member 50 housed in the lower case 40. The upper case 30 is of hollow hemispheric form and made from a synthetic resin. Also, the upper case 30 defines the outer margin, palm rest portion 31, operating levers 34 and 35 formed at a part thereof by a slit 32. The operating levers 34 and 35 have push members integrally formed at a lower surface of the operating levers which will be described later.

The lower case 40 includes a circular bottom portion 42 having an aperture 43 formed in a central portion thereof, and a wall extending from the circumference of the bottom portion 42. The height of the circumferential wall is much smaller than the diameter of the base 42. At the periphery of the aperture 42 a pair of support member 48 are formed at opposite direction. Each support member 48 is formed along the length thereof with an elongated hole 49. Also, formed at a side portion of the circumferential wall is an elongated guide hole 46, and a toothed portion 47 is formed in the inner surface of the circumferential wall along top side of the elongated guide hole 46. Further, the bottom portion 42 has screw holes.

The rotary member 50 include a ring shape plate 52 fitted to the aperture 43 of the lower case 40. The ring plate 52 has a step portion formed along the periphery of and the inner diameter of the ring plate 52 is equal to that of the aperture 43. Also, the ring plate 52 has an aperture formed in a central portion thereof and slightly smaller in diameter than a ball 70. Near aperture of the plate 52, a pair of rotation detectors 60 are placed to cooperate with the ball 70. Also, a circuit board 62 is mounted at a side portion of the plate 52. The circuit board 62 includes the interface circuit elements and other members soldered thereon.

As is well known in the art, the rotation detectors 60 basically comprises a rotatably supported ball, a first follower roller contacting and rotated by the ball, a second follower roller contacting and rotated by the ball and having an axis perpendicular to the axis of the first follower roller, first and second rotation detectors each including rotary electrical members such as variable resistors and encoders to separately detect rotations of the first and second follower rollers. The first and second encoders are connected to the circuit board 62 by lead wires, as shown. Also, connected to the circuit board 62 are pushbutton switches 44 and 45 by lead wires 64. The pushbutton switches 44 and 45 are mounted on a switch board 41 and the switch board 41 is mounted to a side portion of the bottom portion 42 of the lower case 40 when the rotary member 50 is assembled to the lower case 40.

Further, the rotary member 50 has at periphery of the ring plate 52 a pair of hook pieces 54 formed integrally with the plate 52 in opposite direction, and extend upwardly to fit in the elongated holes 49 of the support members 48. Furthermore, the rotary member 50 has at periphery of the ring plate 52, preferably at a position perpendicular to a line crossing the hook pieces 54, an outward extension part 55 having at the end thereof a L-shaped resilient leg member. An operating knob 56 and a projection 57 are formed at outward surface of the leg member.

Figure 4:
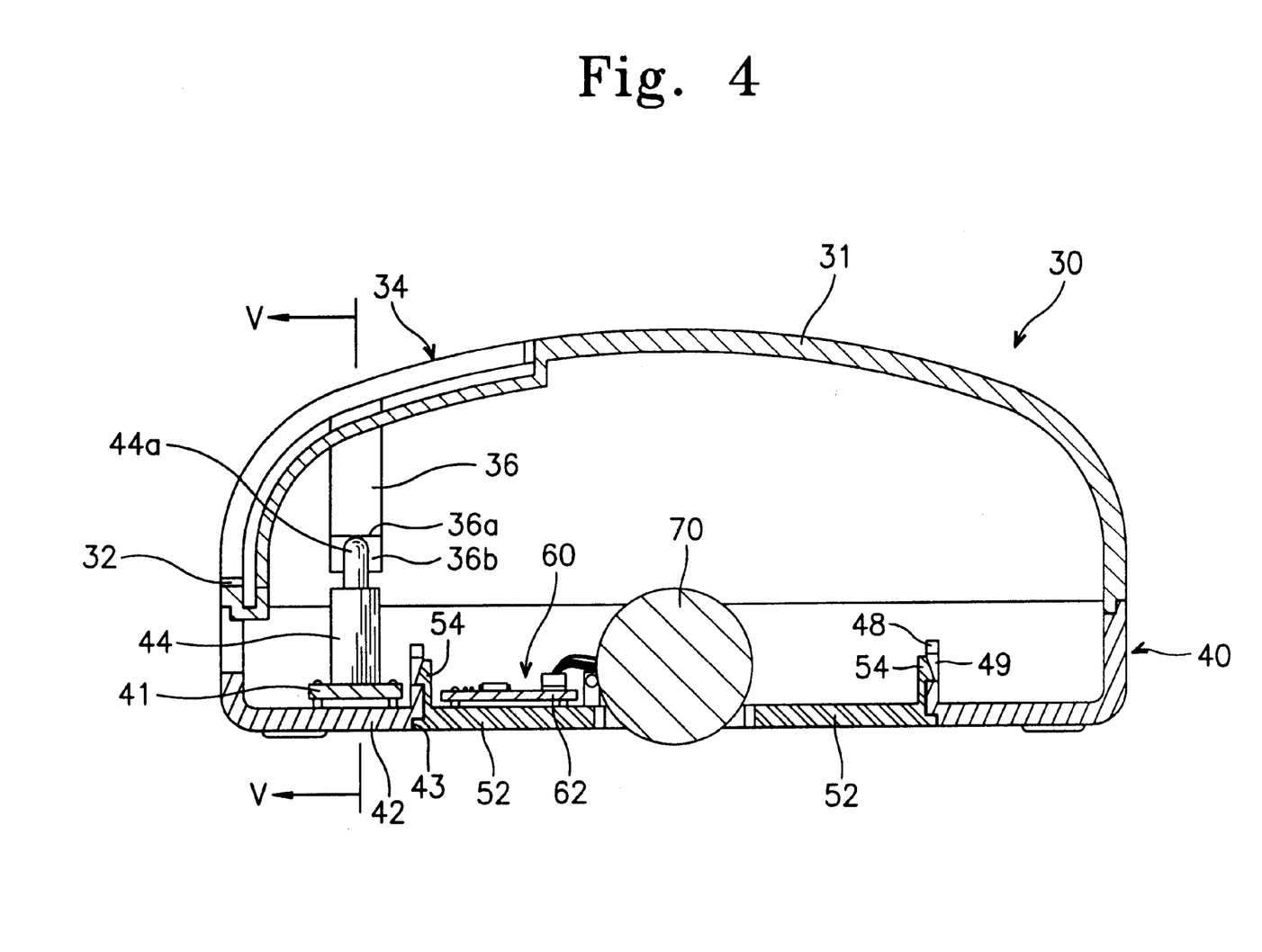
FIG. 4 is a longitudinal sectional view of the mouse of FIG. 3, in the assembled state.
Figure 6:
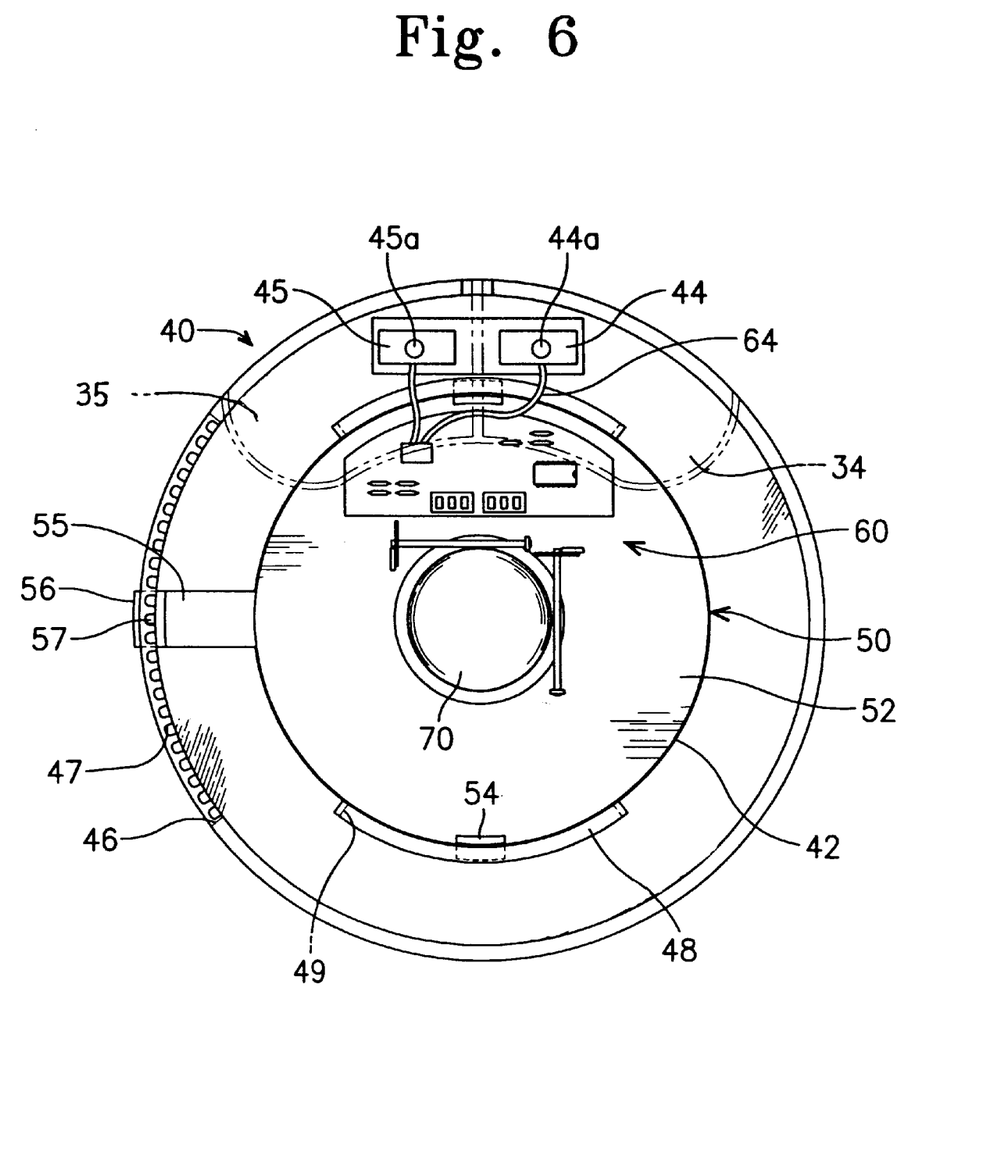
FIG. 6 is a plan view of the mouse with its upper case removed for showing the assembled state of the rotary member relative to the lower case.

FIG. 4 shows the assembled state of the mouse of FIG. 3. First, the rotary member 50 is inserted in the aperture 43 of the lower case 40 upwardly until the operating knob 56 of the extension part 55 is inserted in the guide hole 46 of the circumferential wall and the hook pieces 54 engage the elongated holes 49 of the support members 48. As a result, the protrusion 57 of the L-shaped extension part 55 engages the toothed portion 47 of the circumferential wall and the operating knob 56 of the extension part 55 slightly projects from the circumferential wall through the guide hole 46, as can be seen in FIG. 6.

Then, the rotation detectors 60 are mounted at the designated position near the aperture of the ring plate 52. Also, the circuit board 62 is mounted in the side portion of the ring plate 52 by screws.

In the next step, the switch board 41 carrying the pushbutton switches 44 and 45 is mounted at the designated position of the bottom portion 42 of the lower case 40 by screws. The wiring between the circuit board 62 and the switch board 41 and the rotation detectors 60 compresses lead wires 64.

After the rotary member 50 is mounted in the lower case 40, a ball 70 which may be a steel ball coated with a synthetic resin is inserted in the aperture of the ring plate 52. Then, the upper case 30 is coupled to the lower case 40 by two screws (FIG. 3) applied from the bottom of the lower case 40.

In particular, the upper case 30 has a slit 32 formed in a side portion thereof to define the borders of the operating levers 34 and 35. The operating levers 34 and 35 has push members 36 and 37 integrally formed in lower surface thereof to compress the operating portions 44a and 45a of the pushbutton switches 44 and 45, respectively. As can be clearly seen in FIG. 5, the push members 36 and 37 of the operating levers 34 and 35 have a first contact portions 36a and 37a and a second contact portions 36b and 37b each formed laterally at bottom side of the push members 36 and 37 to have a stepwise shape. The first contact portions 36a and 37a are in contact with the operating portions 44a and 45a of the pushbutton switches 44 and 45, respectively, in the assembled state. The second contact portions 36b and 37b include a slant portion extending downwardly from the first contact portions 36a and 37a.

Figure 5:
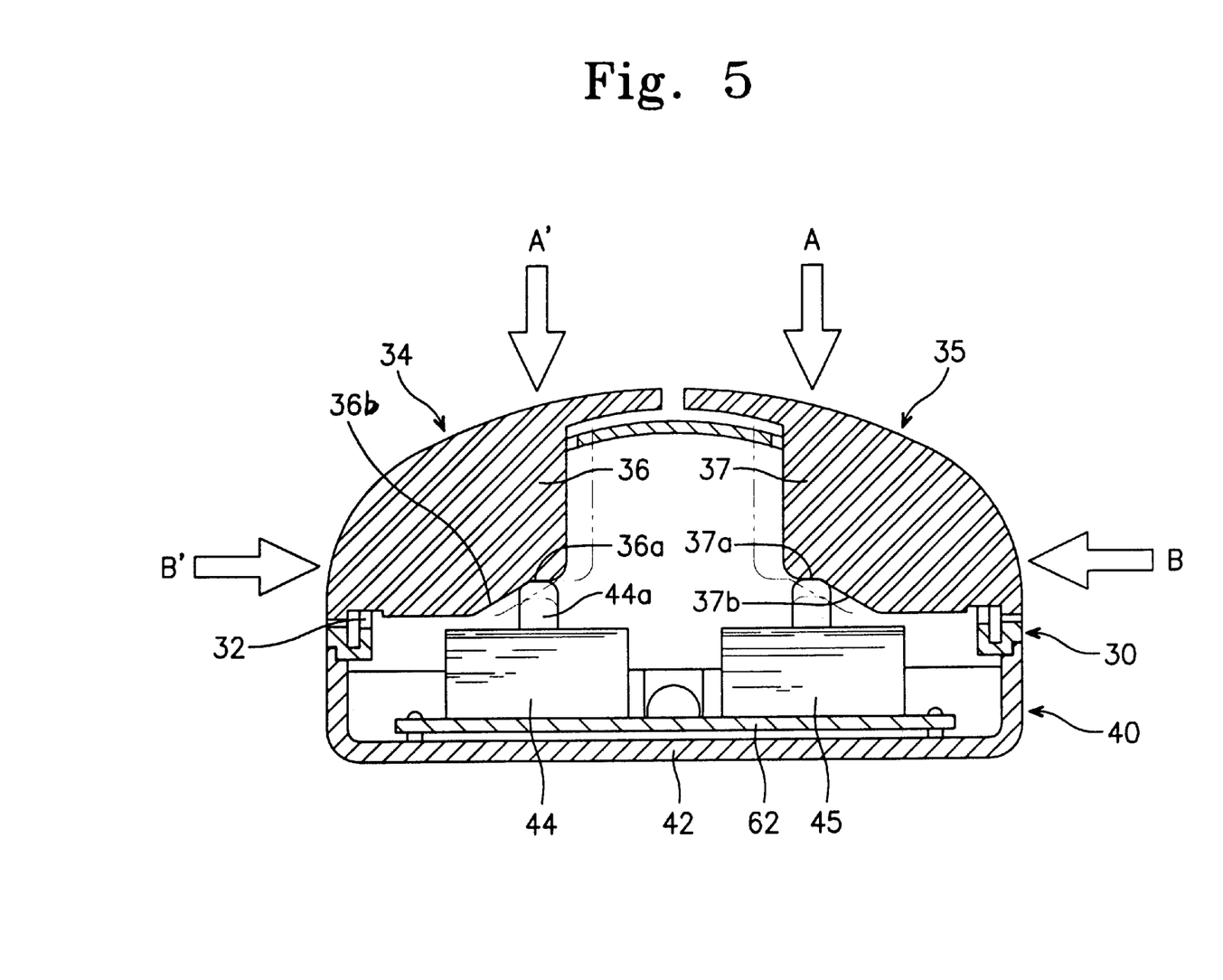
FIG. 5 is a cross-sectional view taken along V—V line of FIG. 4.

As a result, for example, when the operating lever 35 is pressed or clicked by a finger in the vertical direction A, the operating portion 45a of the pushbutton switch 45 is compressed by the first contact portion 37a of the push member 37. Further, when the operating lever 35 is pressed by a finger, preferably by the thumb, in the horizontal direction B, the operating portion 45a of the pushbutton switch 45 is compressed by the slant portion of the second contact portion 37b. Therefore, compressing the operating portions 44a and 45a of the pushbutton switches 44 and 45 either in vertical direction A, A' or in horizontal direction B, B' is possible.

FIG. 6 illustrates the mouse of this invention with its upper case 30 removed for showing the assembled state of the rotary member 50 relative to the lower case 40. As previously mentioned, the rotary member 50 is inserted in the aperture 43 of the lower case 40 until the hook pieces 54 of the rotary member 50 engage the elongated holes 49 of the support members 48 of the lower case 40 and the protrusion 57 of the L-shaped extension part 55 engages the toothed portion 47 of the circumferential wall of the lower case 40. In this state, the hook pieces 54 prevent the rotary member 50 from being separated from the lower case 40. Also, the protrusion 57 of the L-shaped extension part 55 prevents the rotary member 50 from being rotated along the elongated holes 49. Once the operating knob 56 of the extension part 55 is pressed, the protrusion 57 of the extension part 55 comes off the toothed portion 47. Thus, pressing and moving the operating knob 56 along the guide hole 46 enables the rotation of the rotary member 50 with its hook pieces 54 sliding along the elongated holes 49. In the drawing, the position of the switch operating levers 34 and 35 are denoted by a dotted line.

The assembled mouse operates as described below.

Figure 7A:
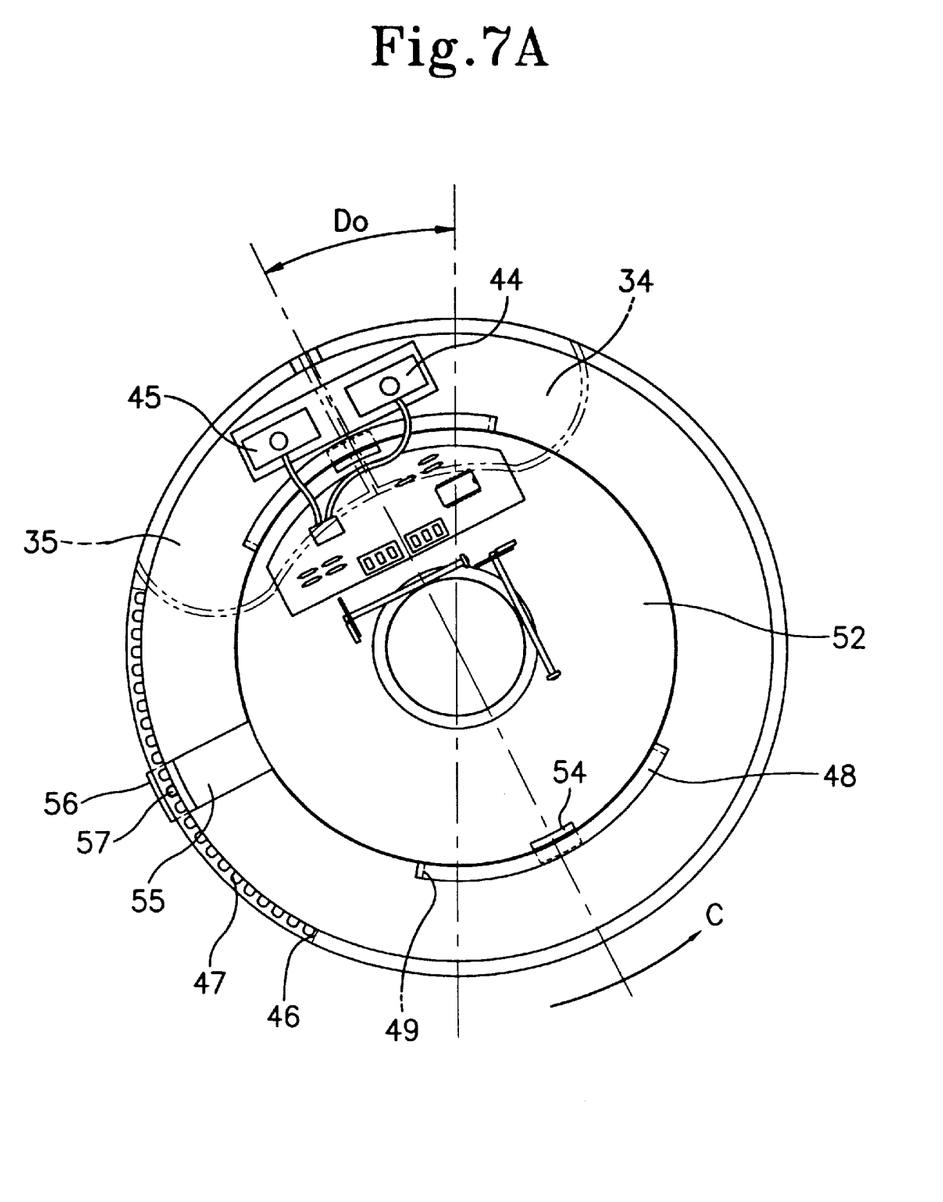
FIG. 7A is a plan view similar to FIG. 6 for illustrating the operative principle of the mouse in which the gripping angle of the casing is changed to locate the left button of the mouse about the normal thumb position.

If it is desired for a user to operate the left operating lever 35 with the thumb of his right hand, the casing of the mouse is first rotated counterclockwise as denoted by an arrow C to change the gripping angle of the casing to an angle $D_o$ as shown in FIG. 7A. In this position, the left operating lever 35 of the mouse can be located at the thumb position in upright posture of the right hand. Also, the X-Y coordinate axis of the rotation detector 60 is rotated at to an angle $D_o$.

Figure 7B:
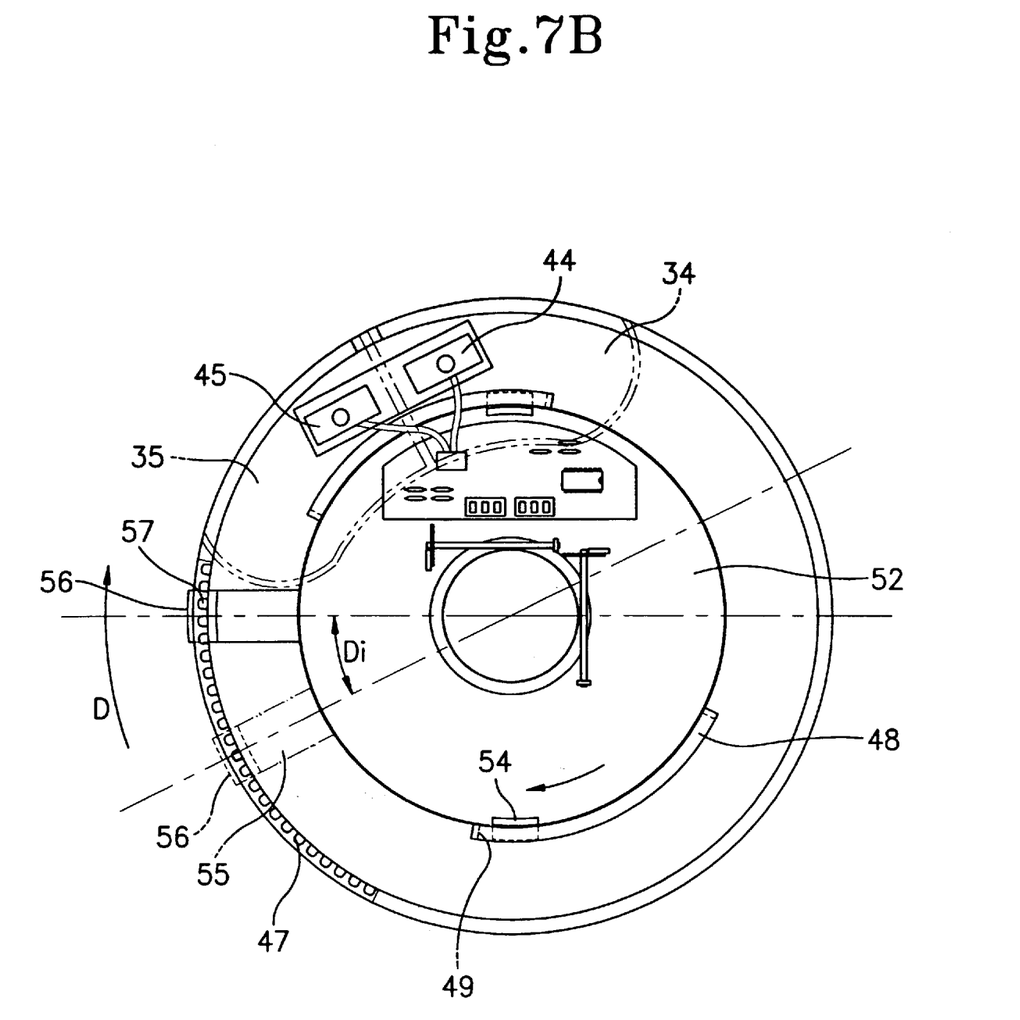
FIG. 7B is a plan view similar to FIG. 6 for illustrating the operative principle of the mouse to move the rotation detector of the rotary member to a desired X-Y coordinates axis.

Next, as shown in FIG. 7B, the operating knob 56 is pressed and moved along the guide hole 46 upwardly as denoted by an arrow D to rotate the rotary member 50 and the rotation detector 60 clockwise to an angle $D_i$, which allows the X-Y coordinate axis of the rotation detector 60 to return to about its original position.

With this, the user can press the left operating lever 35 of the mouse in the horizontal direction by the thumb of his right hand holding the mouse in upright posture to activate the pushbutton switch 45 for a desired command operation. Further, the right operating lever 34 can be pressed in the horizontal direction by the ring finger or little finger of his right hand to activate the pushbutton switch 44. In addition, the user can adjust the X-Y coordinate axis of the mouse to coincide with his intended coordinate axes within the range of rotation defined by the operating knob 56 moving along the guide hole 46.

As apparent from foregoing description, the structure for both vertical and lateral directions operable switch operating levers of this invention provides much convenience in use of the mouse, by permitting any user to readily change the button compressing fingers from the index finger to the thumb or from the middle finger to the ring or little finger. Also, the rotary member arrangement of this invention provides further convenience in use of the mouse by permitting the user to readily coincide his intended coordinate axes with the coordinate axes of the mouse.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A mouse comprising:
   an upper case;
   an operating lever provided at a side portion of the upper case and having a push member integrally formed at a lower surface of the operating lever such that at a bottom side thereof a first contact portion and a second contact portion are formed laterally to have a stepwise shape and are movable in a vertical direction and in a horizontal direction;
   a lower case having an aperture formed in a central portion thereof, a circumferential wall extending from a circumference of a bottom portion of said lower case, an elongated guide hole formed in a side portion of the circumferential wall;
   a rotary member having a ring shape plate, said member being rotatably supported around the aperture of the lower case and provided with a mouse movement detector, said member having a rotating range defined by the guide hole;

a pushbutton switch mounted in a bottom portion of the lower case, said switch having an operating portion thereof operated by the first and second contact portions of the push member;

a lever peripherally extending from the rotary member and having at one end thereof an operating knob, said knob being inserted in the guide hole of the circumferential wall of the lower case to rotate the rotary member along the guide hole; and a rotary member positioning means for positioning the rotary member within the rotating range set by the guide hole;

wherein the first contact portion is in contact with the operating portion of the pushbutton switch, in the assembled state; and wherein the second contact portion includes a slant portion extending downwardly from the first contact portion;

said rotary member including a plurality of hooks formed integrally in the periphery of the ring shape plate, said hooks extending in opposite directions; and a plurality of support members peripherally extending along the aperture of the lower case, each of said support members having an elongated hole receiving one of said hooks.

2. A mouse comprising:

an upper case;

an operating lever provided at a side portion of the upper case and having a push member integrally formed at a lower surface of the operating lever such that at a bottom side thereof a first contact portion and a second contact portion are formed laterally to have a stepwise shape and are movable in a vertical direction and in a horizontal direction;

a lower case having an aperture formed in a central portion thereof, a circumferential wall extending from a circumference of a bottom portion of said lower case, an elongated guide hole formed in a side portion of the circumferential wall;

a rotary member having a ring shape plate, said member being rotatably supported around the aperture of the lower case and provided with a mouse movement detector, said member having a rotating range defined by the guide hole;

a pushbutton switch mounted in a bottom portion of the lower case, said switch having an operating portion thereof operated by the first and second contact portions of the push member;

a lever peripherally extending from the rotary member and having at one end thereof an operating knob, said knob being inserted in the guide hole of the circumferential wall of the lower case to rotate the rotary member along the guide hole; and a rotary member positioning means for positioning the rotary member within the rotating range set by the guide hole;

wherein the rotary member includes a pair of hook pieces formed integrally in the periphery of the ring shape plate, said pieces extending in opposite directions; and a pair of support members peripherally extends along the aperture of the lower case, each of said support members having an elongated hole into which a hook piece fits.

3. A mouse comprising:

an upper case;

an operating lever provided at a side portion of the upper case and having a push member integrally formed at a lower surface of the operating lever such that at a bottom side thereof a first contact portion and a second contact portion are formed laterally to have a stepwise shape and are movable in a vertical direction and in a horizontal direction;

a lower case having an aperture formed in a central portion thereof, a circumferential wall extending from a circumference of a bottom portion of said lower case, an elongated guide hole formed in a side portion of the circumferential wall;

a rotary member having a ring shape plate, said member being rotatably supported around the aperture of the lower case and provided with a mouse movement detector, said member having a rotating range defined by the guide hole;

a pushbutton switch mounted in a bottom portion of the lower case, said switch having an operating portion thereof operated by the first and second contact portions of the push member;

an extension lever peripherally extending from the rotary member and having at one end thereof an operating knob, said knob being inserted in the guide hole of the circumferential wall of the lower case to rotate the rotary member along the guide hole; and a rotary member positioning means for positioning the rotary member within the rotating range set by the guide hole;

wherein the extension lever is located at a position perpendicular to a line crossing a pair of hook pieces of the rotary member.

4. The mouse of claim 3, wherein the extension lever has at an end portion thereof a resilient L-shaped leg member in which the operating knob is formed.

5. The mouse of claim 4, wherein the rotary member positioning means includes a projection formed adjacent the operating knob in the leg member; and a toothed portion, formed in a portion of the inner surface of the circumferential wall corresponding to the length of the guide hole, engages the projection of the leg member with the toothed portion of the circumferential wall in the assembled state.

6. The mouse of claim 5, wherein the projection of the leg member is freed from the toothed portion of the circumferential wall when the operating knob of the extension lever is pressed inwardly, thereby enabling rotating the ring plate of the rotary member.

7. A mouse comprising:

an upper case;

an operating lever provided at a side portion of the upper case and having a push member integrally formed at a lower surface of the operating lever such that at a bottom side thereof a first contact portion and a second contact portion are formed laterally to have a stepwise shape and are movable in a vertical direction and in a horizontal direction;

a lower case having an aperture formed in a central portion thereof, a circumferential wall extending from a circumference of a bottom portion of said lower case, an elongated guide hole formed in a side portion of the circumferential wall;

a rotary member having a ring shape plate, said member being rotatably supported around the aperture of the lower case and provided with a mouse movement detector, said member having a rotating range defined by the guide hole;

a pushbutton switch mounted in a bottom portion of the lower case, said switch having an operating portion thereof operated by the first and second contact portions of the push member;

an extension lever peripherally extending from the rotary member and having at one end thereof an operating knob, said knob being inserted in the guide hole of the circumferential wall of the lower case to rotate the rotary member along the guide hole; and a rotary member positioning means for positioning the rotary member within the rotating range set by the guide hole;

wherein the extension lever has at an end portion thereof a resilient L-shaped leg member in which the operating knob is formed.

8. The mouse of claim 7, wherein the rotary member positioning means includes a projection formed adjacent the operating knob in the leg member; and a toothed portion, formed in a portion of the inner surface of the circumferential wall corresponding to the length of the guide hole, engages the projection of the leg member with the toothed portion of the circumferential wall in the assembled state.

9. The mouse of claim 8, wherein the projection of the leg member is freed from the toothed portion of the circumferential wall when the operating knob of the extension lever is pressed inwardly, thereby enabling rotating the ring plate of the rotary member.

10. A mouse comprising:

an upper case;

an operating lever provided at a side portion of the upper case and having a push member integrally formed at a lower surface of the operating lever such that at a bottom side thereof a first contact portion and a second contact portion are formed laterally to have a stepwise shape and are movable in a vertical direction and in a horizontal direction;

a lower case having an aperture formed in a central portion thereof, a circumferential wall extending from a circumference of a bottom portion of said lower case, an elongated guide hole formed in a side portion of the circumferential wall;

a rotary member having a ring shape plate, said member being rotatably supported around the aperture of the lower case and provided with a mouse movement detector, said member having a rotating range defined by the guide hole;

a pushbutton switch mounted in a bottom portion of the lower case, said switch having an operating portion thereof operated by the first and second contact portions of the push member;

a leg member peripherally extending from the rotary member and having at one end thereof an operating knob, said knob being inserted in the guide hole of the circumferential wall of the lower case to rotate the rotary member along the guide hole; and a rotary member positioning means for positioning the rotary member within the rotating range set by the guide hole;

wherein the rotary member positioning means includes a projection formed adjacent the operating knob in the leg member; and a toothed portion is formed in a portion of the inner surface of the circumferential wall corresponding to the length of the guide hole, engaging the projection of the leg member with the toothed portion of the circumferential wall in the assembled state.

11. The mouse of claim 10, wherein the projection of the leg member is freed from the toothed portion of the circumferential wall when the operating knob of the extension lever is pressed inwardly, thereby enabling rotating the ring plate of the rotary member.

12. A mouse comprising:

a housing comprising an upper case; and a lower case having an aperture formed in a central portion thereof, a circumferential wall extending from a circumference of a bottom portion of said lower case, an elongated guide hole formed in a side portion of the circumferential wall; and an operating lever provided at a side portion of the upper case and having a push member integrally formed at a lower surface of the operating lever such that at a bottom side thereof a first contact portion and a second contact portion are formed laterally to have a stepwise shape and are movable in a vertical direction and in a horizontal direction;

located in the housing, at least two buttons for use by a user;

a rotary member having a ring shape plate, said member being rotatably supported around the aperture of the lower case and provided with a mouse movement detector, said member having a rotating range defined by the guide hole;

a leg member peripherally extending from the rotary member and having at one end thereof an operating knob, said knob being inserted in the guide hole of the circumferential wall of the lower case to rotate the rotary member along the guide hole; and a rotary member positioner placing the rotary member within the rotating range set by the guide hole;

said rotary member positioner comprising a projection formed adjacent the operating knob in the leg member, and a toothed portion formed in a portion of the inner surface of the circumferential wall corresponding to the length of the guide hole, engaging the projection of the leg member with the toothed portion of the circumferential wall while in the assembled state.

13. The mouse of claim 12, wherein a one of said at least two buttons is ordinarily operated by the user's index finger; a second one of said at least two buttons is ordinarily operated by the user's middle finger; said mouse further comprising:

a first means for permitting a user readily to change operation of the button ordinarily operated by the user's index finger to operation of said button by the user's thumb; and a second means for permitting a user readily to change operation of the button ordinarily operated by the user's middle finger to operation of said button by the user's ring finger or little finger.

* * * * *

UNITED STATES PATENT AND TRADEMARK OFFICE
CERTIFICATE OF CORRECTION

PATENT NO. : 6,275,215 B1 Page 1 of 1
APPLICATION NO. : 09/134910
DATED : August 14, 2001
INVENTOR(S) : Jin-Hyung Kim It is certified that error appears in the above-identified patent and that said Letters Patent is hereby corrected as shown below:

On The Title Page,

(56) References Cited

U.S. PATENT DOCUMENTS please change

" 6,022,471 *   6/2000 Lo . . . . . . . . 345/163 "

To

-- 6,072,471 *   6/2000 Lo . . . . . . . . 345/163 --

Signed and Sealed this

Fifth Day of June, 2007

JON W. DUDAS
*Director of the United States Patent and Trademark Office*